United States Patent
Tatiyants et al.

(10) Patent No.: US 9,424,238 B2
(45) Date of Patent: Aug. 23, 2016

(54) METHODS AND SYSTEMS FOR ORDER SET PROCESSING AND VALIDATION

(71) Applicant: Zynx Health Incorporated, Los Angeles, CA (US)

(72) Inventors: Alexander A. Tatiyants, Glendale, CA (US); Sharon M. Young, Santa Monica, CA (US)

(73) Assignee: Zynx Health Incorporated, Los Angeles, CA (US)

( * ) Notice: Subject to any disclaimer, the term of this patent is extended or adjusted under 35 U.S.C. 154(b) by 477 days.

(21) Appl. No.: 13/945,795

(22) Filed: Jul. 18, 2013

(65) Prior Publication Data

US 2014/0033028 A1 Jan. 30, 2014

Related U.S. Application Data

(60) Provisional application No. 61/676,750, filed on Jul. 27, 2012.

(51) Int. Cl.
*G06F 17/24* (2006.01)

(52) U.S. Cl.
CPC ..................... *G06F 17/24* (2013.01)

(58) Field of Classification Search
CPC ...................................................... G06F 17/24
USPC ........................................................ 715/256
See application file for complete search history.

(56) References Cited

U.S. PATENT DOCUMENTS

| | | | |
|---|---|---|---|
| 7,822,626 B2 | 10/2010 | Harp et al. | |
| 8,429,179 B1 * | 4/2013 | Mirhaji | G06F 17/30312 707/756 |
| 2001/0044731 A1 * | 11/2001 | Coffman | G06F 19/327 705/3 |
| 2002/0019749 A1 | 2/2002 | Becker et al. | |
| 2002/0042726 A1 | 4/2002 | Mayaud | |
| 2004/0153341 A1 * | 8/2004 | Brandt | G06F 19/3406 705/2 |
| 2005/0027566 A1 | 2/2005 | Haskell | |
| 2005/0066263 A1 | 3/2005 | Baugher | |
| 2007/0067182 A1 * | 3/2007 | Harp | G06Q 50/22 705/2 |
| 2007/0067183 A1 * | 3/2007 | Harp | G06Q 50/24 705/2 |
| 2007/0067184 A1 * | 3/2007 | Harp | G06F 19/325 705/2 |
| 2007/0165625 A1 * | 7/2007 | Eisner | G06F 9/546 370/389 |

(Continued)

OTHER PUBLICATIONS

Wang, Xueyun Sharon, Leonard Nayda, and Richard Dettinger. "Infrastructure for a clinical-decision-intelligence system." IBM systems journal 46, No. 1 (2007): 151-169.*

(Continued)

*Primary Examiner* — Frank D Mills
(74) *Attorney, Agent, or Firm* — Knobbe, Martens, Olson & Bear LLP

(57) ABSTRACT

Methods and systems for validating order sets that are to be exported are described. Such order set validation may optionally be performed in substantially real-time. A content editor user interface configured to enable a user to create or edit an order set is provided for display. A user selection of a target format to which the order set is to be exported is received. A user edit with respect to the order set is detected and a validation rule is accessed. The rule is applied to the edited order set to obtain a validation evaluation, optionally in substantially real-time, indicating whether the edited order set is ready for export to the target format, and a corresponding validation notification is provided for display via the content editor. The order set may be exported to the user selected target format.

29 Claims, 19 Drawing Sheets

(56) References Cited

U.S. PATENT DOCUMENTS

| | | | |
|---|---|---|---|
| 2007/0178501 A1* | 8/2007 | Rabinowitz | G06Q 50/24 435/6.16 |
| 2009/0254509 A1* | 10/2009 | Baluta | G06F 19/327 706/52 |
| 2010/0004948 A1 | 1/2010 | Toomey | |
| 2010/0250282 A1* | 9/2010 | Johnson | G06Q 50/24 705/3 |
| 2011/0145018 A1* | 6/2011 | Fotsch | G06F 19/326 705/3 |
| 2011/0289403 A1 | 11/2011 | McDonald | |
| 2011/0295873 A1 | 12/2011 | Potter | |
| 2011/0301982 A1* | 12/2011 | Green, Jr. | G06F 19/3443 705/3 |
| 2013/0035961 A1 | 2/2013 | Yegnanarayanan | |
| 2013/0054512 A1 | 2/2013 | Ephrat | |
| 2013/0085781 A1* | 4/2013 | Navani | G06F 19/322 705/3 |
| 2013/0085798 A1* | 4/2013 | Spatola | G06Q 10/06 705/7.24 |

OTHER PUBLICATIONS

International Search Report and Written Opinion from PCT/US2013/051370 dated Oct. 29, 2013, 12 pages.

Payne, "The transition to automated practitioner order entry in a teaching hospital: the VA Puget Sound experience," *Proc AMIA Symp*. 1999:589-593.

\* cited by examiner

New Med Detail Item

Alcohol Withdrawal – Discharge

Export Validation: [Custom v.1. Text ▼]

Order Set
General
Nursing Orders
Medications
Consults

Medications
  GABA Analogs
    Acetaminophen
      2 tablet orally 3 times a day
      New Item

[+ Add Top Level Item]

Commands
Expand All
Collapse All
Print View
Export View
Check In
Undo Checkout

New Item

[Workspace]

Pre-Select: ● Optional  ○ Default  ○ Required
Item detail mapped to: N/A
⚠ This item detail is not mapped Print/Export: ● Both  ○ Print Only  ○ Export Only Dose Strength [      ]   Dose Unit [      ▼]   Dose Form [      ▼]

Solution Rate [      ]   Solution Rate Unit [      ▼]   Route of Admin [      ▼]

Frequency [      ▼]   Duration [      ]   Duration Unit [      ▼]

Prn reasons [      ▼]   Prn Reasons Override [      ]   Details [      ]

Order Type [      ▼]

[Save]   [Save & Hide]   [Cancel]

Review Comments (0)

*FIG. 3A*

New Med Detail Item

Alcohol Withdrawal – Discharge

Export Validation: [V1.XML ▼]

Validating...

Order Set
- General
- Nursing Orders
- Medications
- Consults

Medications
- ▷ GABA Analogs
- ▷ Acetaminophen
- ▷ 2 tablet orally 3 times a day
- ▷ New Item

[+ Add Top Level Item]

Commands
- Expand All
- Collapse All
- Print View
- Export View
- Check In
- Undo Checkout

New Item

[Workspace]

Pre-Select: ● Optional  ○ Default  ○ Required   Print/Export: ● Both  ○ Print Only  ○ Export Only
Item detail mapped to: N/A

| Dose Strength | Dose Unit | Dose Form |
| 325 | [ ▼ ] | [ ▼ ] |

| Solution Rate | Solution Rate Unit | Route of Admin |
| | [ ▼ ] | [ ▼ ] |

| Frequency | Duration | Duration Unit |
| [ ▼ ] | | [ ▼ ] |

| Prn reasons | Prn Reasons Override | Details |
| [ ▼ ] | | |

| Order Type |
| [ ▼ ] |

[ Save ]  [ Save & Hide ]  [ Cancel ]

Review Comments (0)

*FIG. 3B*

New Med Detail Item

Alcohol Withdrawal – Discharge

Export Validation: [V L Text]

Order Set
General
Nursing Orders
Medications
Consults

Medications
▽ GABA Analogs
▽ Acetaminophen
▽ 2 tablet orally 3 times a day
▽ New Item

[+ Add Top Level Item]

Commands
Expand All
Collapse All
Print View
Export View
Check In
Undo Checkout New Item
[Workspace]

Pre-Select: ⦿ Optional  ○ Default  ○ Required
Item detail mapped to: N/A
⚠ This item detail is not mapped

| Dose Strength | Dose Unit | Dose Form |
| 325 | | |

| Solution Rate | Solution Rate Unit | Route of Admin |

| Frequency | Duration | Duration Unit |

| Prn reasons | Prn Reasons Override | Details |

| Order Type | | |

Print/Export: ⦿ Both  ○ Print Only  ○ Export Only

[Save]  [Save & Hide]  [Cancel]

Review Comments (0)

*FIG. 3C*

New Med Detail Item

Alcohol Withdrawal – Discharge

Export Validation: [v.1. Test]

Order Set
- General
- Nursing Orders
- Medications
- Consults

Medications
- GABA Analogs
- Acetaminophen
  - 2 tablet orally 3 times a day
  - New Item

[+ Add Top Level Item]

Commands
- Expand All
- Collapse All
- Print View
- Export View
- Check In
- Undo Checkout

New Item

Workspace

Pre-Select: ● Optional  ○ Default  ○ Required    Print/Export: ● Both  ○ Print Only  ○ Export Only Item detail mapped to: N/A After saving this item will be mapped for: Acetaminophen 325 MG TAB

| Dose Strength | Dose Unit | Dose Form |
|---|---|---|
| 325 | MG [Z] | Orally [C] |

| Solution Rate | Solution Rate Unit | Route of Admin |
|---|---|---|

| Frequency | Duration | Duration Unit |
|---|---|---|
| 5 times a day | | |

| Prn reasons | Prn Reasons Override | Details |
|---|---|---|

Order Type

[Save]  [Save & Hide]  [Cancel]

Review Comments (0)

FIG. 3D

New Med Detail Item

Alcohol Withdrawal – Discharge

Export Validation: [V.J. Text ▼]

⚠ Content has export error(s)

Order Set

General
Nursing Orders
Medications
Consults

Medications
▽ GABA Analogs
▽ Acetaminophen
2 tablet orally 3 times a day
325 MG orally 5 times a day + Add Top Level Item

Commands
Expand All
Collapse All
Print View
Export View
Check In
Undo Checkout

Review Comments (0)

Acetaminophen 325 MG Orally 5 times a day

Workspace

Pre-Select: ◉ Optional ○ Default ○ Required   Print/Export: ◉ Both ○ Print Only ○ Export Only Item detail mapped to: N/A  [Map Detail]
⚠ This item detail is not mapped

| Dose Strength | Dose Unit | Dose Form |
| --- | --- | --- |
| 325 | MG [Z] ▼ | Orally [C] ▼ |

| Solution Rate | Solution Rate Unit | Route of Admin |
| --- | --- | --- |
| | | ▼ |

| Frequency | Duration | Duration Unit |
| --- | --- | --- |
| 5 times a day ▼ | | ▼ |

| Prn reasons | Prn Reasons Override | Details |
| --- | --- | --- |
| ▼ | | |

| Order Type | | |
| --- | --- | --- |
| ▼ | | |

[ Save ]   [ Save & Hide ]   [ Cancel ]

*FIG. 3E*

Edit Med Detail Item

Alcohol Withdrawal – Discharge

Export Validation: v.1.XML

⚠ Content has export errors

Order Set
- General
- Nursing Orders
- Medications
- Consults

Medications
- GABA Analogs
  - Acetaminophen
    - 2 tablet orally 3 times a day
    - 325 MG orally 2 times a day + Add Top Level Item

Commands
- Expand All
- Collapse All
- Print View
- Export View
- Check In
- Undo Checkout Acetaminophen 325 MG orally 2 times a day

| Workspace |

Pre-Select: ● Optional  ○ Default  ○ Required    Print/Export: ● Both  ○ Print Only  ○ Export Only Item detail mapped to: N/A  : Map Detail
⚠ This item status is not mapped

| Dose Strength | Dose Unit | Dose Form |
|---|---|---|
| 325 | MG [Z] ▼ | Orally [C] ▼ |

| Solution Rate | Solution Rate Unit | Route of Admin |
|---|---|---|
|  |  | ▼ |

| Frequency | Duration | Duration Unit |
|---|---|---|
| 2 times a day ▼ |  | ▼ |

| Prn reasons | Prn Reasons Override | Details |
|---|---|---|
| ▼ |  |  |

| Order Type |
|---|
| ▼ |

[ Save ]  [ Save & Hide ]  [ Cancel ]

Review Comments (0)

*FIG. 3F*

Map Detail

Alcohol Withdrawal

Map detail

Please type in a medication to map to:

Acetaminophen 325 MG orally 2 times a day

Order Set

General
Nursing Orders
Medications
Consults ac

Enter at least 2 characters to search

| Term Name | Term Type | Vocabulary |
|---|---|---|
| Acetaminophen 325 MG TAB | Term Type B | Vocab1 |
| Acetaminophen 325 MG TABLET | Term Type A | Vocab 2 |
| Acetaminophen 625 MG TAB | Term Type A | Vocab 1 |

+ Add Top Level

Commands

Expand All
Collapse All
Print View
Export View
Check In
Undo Checkout

Export Only

Map    Cancel

Review Comments

Map vocabulary term Acetaminophen 325 MG TAB to Note: Once mapped, you can only unmap through the control panel.

Save    Save & Hide    Cancel

*FIG. 3G*

Edit Med Detail Item

Alcohol Withdrawal – Discharge

Export Validation: [v1.XML ▼]

⚠ Content has export error(s)

Order Set
General
Nursing Orders
Medications
Consults

▽▽▽▽ Medications
    GABA Analogs
        Acetaminophen
            2 tablet orally 3 times a day
            325 MG orally 2 times a day

[+ Add Top Level Item]

Acetaminophen 325 MG Orally 2 times a day

| Workspace |

Pre-Select: ⦿ Optional  ○ Default  ○ Required
Item detail mapped to: N/A  | Map Detail
After saving this item will be mapped to: Acetaminophen 325 MG TAB
Print/Export: ⦿ Both  ○ Print Only  ○ Export Only Dose Strength          Dose Unit           Dose Form
[325]                  [MG [Z] ▼]          [Orally [C] ▼]

Solution Rate          Solution Rate Unit  Route of Admin
[        ]             [      ▼]           [       ▼]

Frequency              Duration            Duration Unit
[2 times a day ▼]      [        ]          [       ▼]

Prn reasons                                Prn Reasons Override
[          ▼]                              [              ]

Order Type             Details
[          ▼]          [              ]

[Save]  [Save & Hide]  [Cancel]

Commands
Expand All
Collapse All
Print View
Export View
Check In
Undo Checkout

Review Comments (0)

Edit Med Detail Item

Alcohol Withdrawal – Discharge

Export Validation: ▣ Ready for export.

Order Set
General
Nursing Orders
Medications
Consults

Medications
▽▷▷ GABA Analogs
 ▷ PERCOCET 5-325
  2 tablet orally 3 times a day
  325 MG orally 5 times a day PERCOCET 5-325 MG Orally 5 times a day

| Workspace |

Pre-Select: ● Optional  ○ Default  ○ Required     Print/Export: ● Both  ○ Print Only  ○ Export Only
Item detail will export as: TYLENOL 625 MG TAB [updated] : Clear Override

| Dose Strength | Dose Unit | Dose Form |
| 325 | MG [Z] ▸ | Orally [C] ▸ |
| Solution Rate | Solution Rate Unit | Route of Admin ▸ |
| Frequency | Duration | Duration Unit |
| 5 times a day ▸ | | |
| Prn reasons | Prn Reasons Override | Details |
| Order Type ▸ | | |

[ Save ]  [ Save & Hide ]  [ Cancel ]

Commands
+ Add Top Level Item
Expand All
Collapse All
Print View
Export View
Check In
Undo Checkout

Review Comments (0)

FIG. 4B

Med Detail with Map Link

Alcohol Withdrawal – Discharge

Export Validation: [V.1. Text ▼]

Order Set
- General
- Nursing Orders
- Medications
- Consults

Medications
- Analgesics
  - acetaminophen
    - 325 to 500 MG TAB every 6 days

+ Add Top Level Item

Commands
- Expand All
- Collapse All
- Print View
- Export View
- Check In
- Undo Checkout Workspace Acetaminophen 325 to 500 MG TAB every 6 days 24 hour Pre-Select: ● Optional  ○ Default  ○ Required     Print/Export: ● Both  ○ Print Only  ○ Export Only Item detail will export as: N/A | Map
⚠ This item detailed is not mapped

| Dose Strength | Dose Unit | Dose Form |
| 325 to 500 | MG [Z] ▼ | TAB [C] ▼ |

| Solution Rate | Solution Rate Unit | Route of Admin |

| Frequency | Duration | Duration Unit |
| Every 6 days [Z] ▼ | 24 | hour |

| Prn reasons | Prn Reasons Override | Details |

Order Type [▼]

[Save]  [Save & Hide]  [Cancel]

Review Comments (0)

FIG. 5A

Map Med Detail Window

Alcohol Withdrawal – Discharge     Export Validation: V.I. Text

Order Set
General
Nursing Orders
Medications
Consults

+ Add Top Level Item

Commands
Expand All
Collapse All
Print View
Export View
Check In
Undo Checkout

Review Comments (0)

Medications
  Analgesics
    acetaminophen
      325 to 500 MG TAB every 6 days

Acetaminc  Map Detail

Work
Pre-Selec
Item det:   Acetaminophen 325 to 500 MG   Exports as
  This 8
Dose St:   Please select a vocabulary term to map
325 to 5(
Solution                          Term Name              Term Type
Frequen
Every 6    Search population criteria:
Prn reas   - Include all vocabularies in the environment associated with
             selected export format
Order T    - Include only mapped or unmapped terms from the Medications
             vocabulary term type
           - All terms must be of active status Map      Cancel Note: Once mapped, this term can only be unmapped through
AuthorSpace Vocabulary Manager

*FIG. 5B*

| Object/Item | No | Feature/Rule | Message Type | Icon |
|---|---|---|---|---|
| Section | 1 | section level cannot exceed 2 levels | Error | ⚠ |
| | 2 | Catalog term must be active | Error | ⚠ |
| | 3 | Both term and override field are empty | Error | ⚠ |
| | 4 | Both term and override are selected | Warning | ⚠ |
| | 5 | A term must be mapped to an active vocabulary term | Error | ⚠ |
| | 6 | | | |
| Non-Med Orderable | 6 | Catalog term must be mapped | Error | ⚠ |
| | 7 | Catalog term must be active | | |
| | 8 | Override field is not supported | Error | ⚠ |
| | 9 | A term must be selected in catalog field | Error | ⚠ |
| | 10 | A term must be mapped to an active vocabulary term | Error | ⚠ |
| | 11 | Additional Info field cannot exceed 64 chars | Warning | ⚠ |
| | 12 | Comment field is not supported | Warning | ⚠ |
| Non-Med Detail | 13 | Selected WDF term must be mapped | Error | ⚠ |
| | 14 | Selected WDF term must be mapped to an active vocabulary term | Error | ⚠ |
| | 15 | PRN Reason override cannot exceed 64 chars | Error | ⚠ |
| | 16 | Instructions cannot be exceed 255 chars | Error | ⚠ |
| | 17 | Start End fields should be in specified format | Error | ⚠ |
| | 18 | Selected catalog term must be active | Error | ⚠ |
| Med Orderable | 19 | Catalog term must be mapped | Error | ⚠ |
| | 20 | Catalog term must be active | Error | ⚠ |
| | 21 | A term must be selected in catalog field | Error | |
| | 22 | A term must be mapped to an active vocabulary term | Error | |
| | 23 | Override field is not supported | Error | ⚠ |
| Med Detail | 24 | PDM orderable cannot have detail | Error | ⚠ |

| FIG. 6-1 |
|---|
| FIG. 6-2 |

|  |  |  |  |
|---|---|---|---|
|  | 25 | Create CFMDS on save the workspace for Zynx Order Detail |  |
|  | 26 | Global Mapping CFMDS to PDM for Zynx Order Detail |  |
|  | 27 | Local override PDM for Zynx Order Detail |  |
|  | 28 | Show vocab term for med detail |  |
|  | 29 | Selected WDF term must be mapped | Error |
|  | 30 | Selected WDF term must be mapped to an active vocabulary term | Error |
|  | 31 | Selected catalog term must be active | Error |
| Bundle | 32 | Bundle will export as a Section | Warning |
| Linkable |  |  |  |
| Reminder | 33 | reminder length cannot be greater than 253 | Error |
| Order set Header | 34 | External ID cannot be empty or longer than 16 | Error |
| Freetext Detail | 35 | Freetext Detail is not supported | Error |
| Plan of Care |  |  |  |
| Reminder | 36 | reminder length cannot be greater than 253 | Error |
| Orderable workspace | 37 | Catalog term must be mapped | Error |
|  | 38 | Catalog term must be active | Error |
| Activity workspace | 39 | Catalog term must be mapped | Error |
|  | 40 | Catalog term must be active | Error |
|  | 41 | Selected WDF term must be mapped | Error |
|  | 42 | Selected WDF term must be mapped to an active vocabulary term | Error |

FIG. 6-2

METHODS AND SYSTEMS FOR ORDER SET PROCESSING AND VALIDATION

INCORPORATION BY REFERENCE TO ANY PRIORITY APPLICATIONS

Any and all applications for which a foreign or domestic priority claim is identified in the Application Data Sheet as filed with the present application, are hereby incorporated by reference in their entirety under 37 CFR 1.57.

COPYRIGHT RIGHTS

A portion of the disclosure of this patent document contains material that is subject to copyright protection. The copyright owner has no objection to the reproduction by any one of the patent document or the patent disclosure, as it appears in the patent and trademark office patent file or records, but otherwise reserves all copyright rights whatsoever.

BACKGROUND OF THE INVENTION

1. Field of the Invention

The present invention is generally related to order set and plan of care processing, and in particular, to methods and systems for exporting an order set or plan of care.

2. Description of the Related Art

Recently, electronic provision and management of order sets have been implemented. An order set generally includes a grouping of orders, and enables standardization of the ordering process for a common clinical scenario, such as might occur in a hospital setting. Examples of order sets include admission order sets for use in admitting a patient to a given service or venue, diagnosis order sets for use in standardizing care orders for respective common clinical diagnoses, and convenience order sets for use in standardizing orders for respective clinical goals (e.g. a treatment procedure). A library of order sets may include order sets covering disease-related groups and symptoms for various populations (e.g., females, males, adults and children).

In many instances, it may be necessary to export order sets from one system to another system, such as a Computerized Provider Order Entry (CPOE) system or an electronic health record (EHR) system. However, after the export operation is performed, it may not be possible to import the exported file to the target system because of unmapped terms or other integration issues. Thus, conventionally, it may be necessary to manually guess as to why the exported order set was not imported into the target system, manually guess at what changes need to be made to the order set to permit the order set to export properly, make those edits to the order set via an editing program, export the edited order set, determine if the exported, edited order set was imported into the target system, and if not, repeat the process as many times as needed until the order set can be imported to the target system. The foregoing conventional process is time consuming, expensive, and may result in numerous errors.

SUMMARY OF THE INVENTION

Disclosed herein are systems and methods of validating, documents, such as order sets, for export to target systems and formats, such as Computerized Provider Order Entry (CPOE) systems and electronic health record (EHR) systems and respective formats.

Such order set validation may optionally be performed in substantially real-time. A content editor user interface, configured to enable a user to create or edit an order set, is provided for display on a display device. A user selection of a target format to which the order set is to be exported is detected. A user edit with respect to the order set is detected and an export validation rule is accessed. The rule is applied to the edited order set to obtain a validation evaluation, optionally in substantially real-time, indicating whether the edited order set is ready for export to the target format. A corresponding validation notification is provided for display via the content editor. The order set may be exported to the user selected target format.

An example embodiment provides a method of processing order sets, the method comprising: providing for display on a user terminal a content editor user interface configured to enable a user to create or edit an order set; receiving, at a computer system, a user selection of a target format to which the order set is to be exported; detecting, by the computer system, a user edit with respect to the order set in substantially real time; accessing, by the computer system, at least a first validation rule from memory storing a plurality of validation rules, the plurality of order set validation rules include one or more mapping rules for mapping terms in a source catalog to terms used by the user selected target format; accessing, by the computer system, a first version of the order set without the user edit; applying by the computer system, in substantially real time, the user edit to the first version of the order set to generate an edited order set; applying by the computer system, in substantially real time, the first validation rule to the edited order set to obtain a validation evaluation indicating whether the edited order set is ready for export to the target format; based at least in part on the validation evaluation, providing by the computer system in substantially real time, a corresponding validation notification for display via the content editor; and after determining that the order set is ready for export, exporting by the computer system the order set, including at least one user edit, to the user selected target format. Optionally, the user terminal may comprise or be in communication with a web-based client, and certain embodiments may provide synchronization validation for such a client, such as for a web application programming interface client.

Another embodiment provides a method of processing order sets, the method comprising: providing, by a computer system, for display on a display device a content editor user interface configured to enable a user to create or edit an order set; receiving, by the computer system, a user selection of a target format to which the order set is to be exported; detecting, by the computer system, a user edit with respect to the order set in substantially real time; accessing, by the computer system, at least a first validation rule; applying by the computer system, in substantially real time, the first validation rule to the order set, including the user edit; evaluating, by the computer system, whether an integration issue exists with respect to the target format based at least in part on the application of the first validation rule to the order set, including the user edit; based at least in part on the evaluation, providing by the computer system in substantially real time, a validation notification for display; and after providing the notification for display, exporting the order set, including at least one user edit, to the user selected target format.

Another embodiment provides a transitory computer readable media storing instructions that when executed by a computer system are configured to cause the computer system to perform operations, comprising: providing for display on a display device a content editor user interface configured to enable a user to create or edit an order set; receiving a user selection of a target format to which the order set is to be exported; detecting a user edit with respect to the order set in substantially real time; accessing at least a first validation rule; applying by the computer system, in substantially real time, the first validation rule to the order set, including the user edit; evaluating whether an integration issue exists with respect to the target format based at least in part on the application of the first validation rule to the order set, including the user edit; based at least in part on the evaluation, providing, in substantially real time, a validation notification for display; and after providing the notification for display, exporting the order set, including at least one user edit, to the user selected target format.

Another embodiment provides an order set processing system, comprising: a computing system; non-transitory computer readable media storing instructions that when executed by the computer system are configured to cause the computer system to perform operations, comprising: providing for display on a display device a content editor user interface configured to enable a user to create or edit an order set; receiving a user selection of a target format to which the order set is to be exported; detecting a user edit with respect to the order set in substantially real time; accessing at least a first validation rule; applying by the computer system, in substantially real time, the first validation rule to the order set, including the user edit; evaluating whether an integration issue exists with respect to the target format based at least in part on the application of the first validation rule to the order set, including the user edit; based at least in part on the evaluation, providing, in substantially real time, a validation notification for display; and after providing the notification for display, exporting the order set, including at least one user edit, to the user selected target format.

An example embodiment provides a method of processing order sets, the method comprising optionally providing for display on a user terminal a content editor user interface configured to enable a user to create or edit an order set. Optionally a user selection of a target format to which the order set is to be exported may be received. Optionally, a user edit with respect to the order set may be detected, optionally in substantially real time. A first validation rule may be accessed from a memory storing a plurality of validation rules, the plurality of order set validation rules include one or more mapping rules for mapping terms in a source document (e.g., a catalog) to terms used by another format (e.g., the user selected target format). Optionally, a first version of the order set without the user edit is accessed. Optionally, the user edit to the first version of the order set is applied to generate an edited order set. The first validation rule to the edited order set may be applied (optionally in substantially real time) to obtain a validation evaluation indicating whether the edited order set is ready for export to the target format. Based at least in part on the validation evaluation, a corresponding validation notification may be provided for display (optionally in substantially real time) via the content editor. After determining that the order set is ready for export, the order set may be exported, optionally including at least one user edit, to the target format (e.g., the user selected target format). Optionally, the user terminal may comprise or be in communication with a web-based client, and certain embodiments may provide synchronization validation for such a client, such as for a web application programming interface client. A system may be provided configured to execute the foregoing method.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

FIGS. 2A-5B illustrate example user interfaces.

FIG. 6 illustrates example validation rules.

DETAILED DESCRIPTION OF PREFERRED EMBODIMENTS

Figure 1:
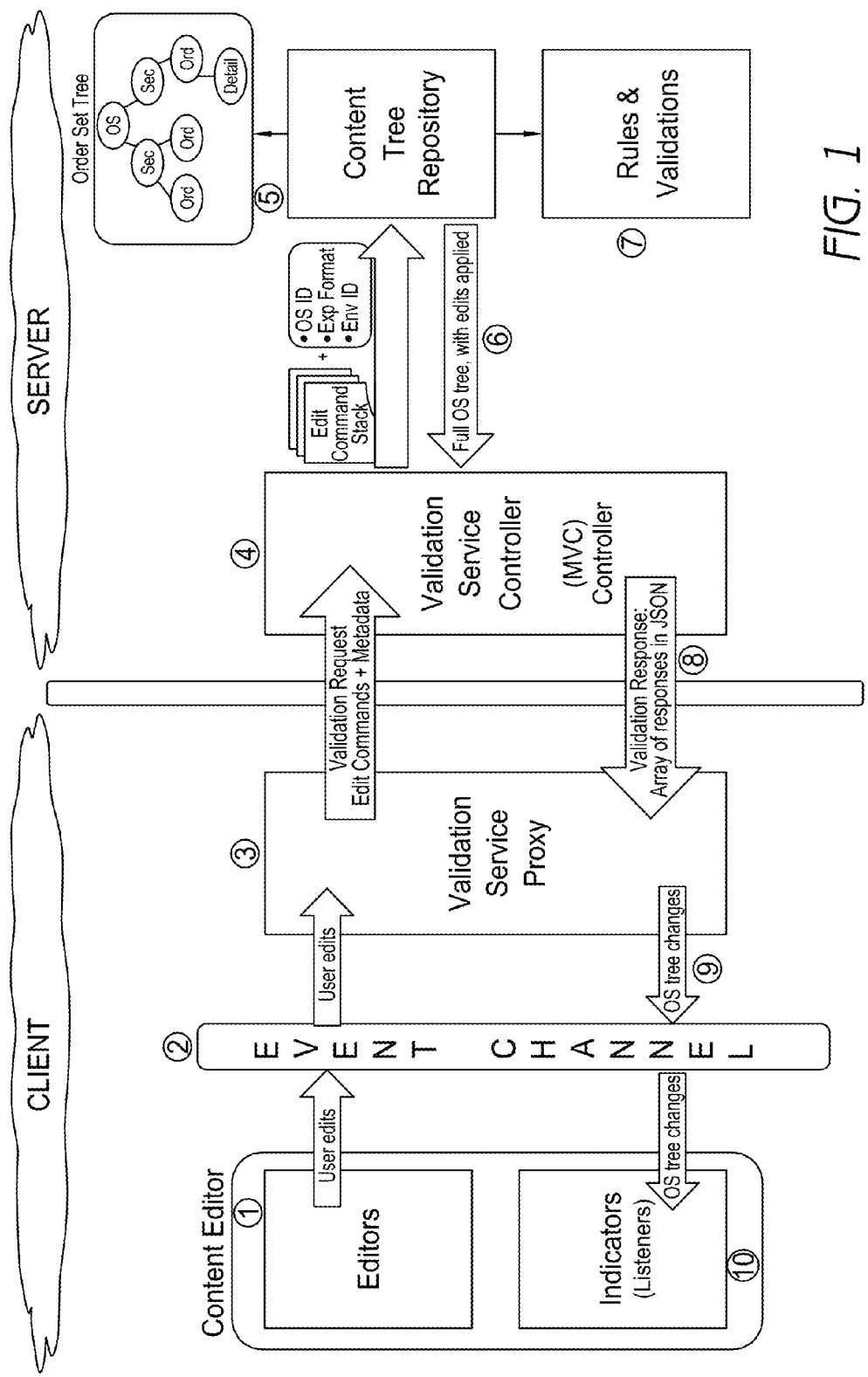
FIG. 1 illustrates an example export validation flow process.

Systems and processes for managing documents, such as order set and plan of care documents, are described herein. As further described herein, certain embodiments enable the validation of an order set or plan of care via a content editor, prior to exporting the order set or plan of care to a different format for use by a target system.

As similarly discussed above, electronic provision and management of order sets have been conventionally implemented. An order set generally includes grouping of orders, and enables standardization of the ordering process for a common clinical scenario, such as might occur in a hospital setting. For example, an order set may include a group of interventions that are specific to a condition or procedure and pertain to a venue of care (e.g., a clinical location, such as an intensive care unit, an emergency department, etc.). Thus, as noted above, examples of order sets include admission order sets for use in admitting a patient to a given service or venue, diagnosis order sets for use in standardizing care orders for respective common clinical diagnoses, convenience order sets for use in standardizing orders for respective clinical goals (e.g., a treatment procedure), etc. For example, the order sets may cover various disease-related groups and symptoms for females, males, adults and children. Preferably the order sets are evidenced-based.

Certain embodiments described herein facilitate the use of controlled terminology in the use of order sets to reduce or eliminate the use of freeform or natural language terminology. While natural language permits great complexity in communicating information, it also introduces a great deal of ambiguity and confusion. For example, different users may use different terminology or abbreviations for the same item. Such confusion can lead to unacceptable results when communicating orders regarding medical treatment, medications, dosages, and the like. Certain embodiments described herein facilitate the use of standardized terminology by mapping terms in a source order set to terms of local client catalogs, national electronic medical records catalogs, or other standardized terminology sources. Such mapping of standardized terminology enables users to export customized order sets to a target electronic medical records system without losing semantic meaning in the clinical content. Certain embodiments may provide synchronization validation for web-based clients, such as for web application programming interface (API) clients.

Optional features of example order sets will now be described.

An electronic order set in accordance with certain embodiments herein may be hierarchical and may include one or more sections. An order set section may be used to organize order detail items within the order set. A detail may include a further description or clarification of certain concepts for an activity in a plan of care, a medication order item in an order set, or a non-medication order item in an order set. By way of illustration, an order may be a type of drug or medication, a type of test, a type of treatment, and an order detail may specify details for the order. For example, a drug detail may specify dosage, dosage unit, or dosage frequency. Sections may also be used to organize items in a plan of care. Non-limiting examples of order set sections include: condition, vital signs, activity, nursing orders, patient/caregiver education, respiratory, diet, IV fluids, medications, blood bank, laboratory, radiology, diagnostic tests, specialty, consults, non-categorized, etc. An order set section may contain subsections and one or more levels of sub-subsections.

A plan of care, addressing a specific patient problem, may include such sections as a goal section (containing expected outcomes), an intervention section, etc. The intervention section may contain subsections (e.g., reminders, activities, checklist details). Similarly, the goal section may contain subsections.

An order set or order set section, and a plan of care or plan of care section, may include one or more item details. In certain embodiments, an order set may include one or more evidence links or other links.

A given order set or plan of care may be provided in the form of a template which may be customized by a given user/organization via a content management system.

An example content management system may be utilized to create and edit orders sets, to manage the order sets, and to provide order set version control and maintenance. The customization for a given order set or order set template may optionally be performed collaboratively by multiple users, such as multiple clinicians, or by a single user. A user may build an order set and/or customize an order set by adding, deleting, or modifying specific order items.

The content management system may be utilized to map order set terms to local client catalogs, national electronic medical records catalogs, and/or other standardized terminology sources used by a target system to permit the order sets to be exported to the target system, while maintaining the semantic meaning in the order set clinical content.

Certain embodiments of the content management system described herein enable a user to validate an order set during the development phase for export to a Computerized Provider Order Entry (CPOE) system using a compatible format, an Electronic Health Record (EHR) system using a compatible format, or other target system and format. The export validation process may utilize validation rules to identify items in the order set that will prevent the order set from being properly exported to or imported by the target system, and may provide corresponding warnings/error notifications to the user.

For example, export validation may identify missing or inactive catalog terms, ambiguous term mappings, unsupported export fields, missing details needed for export, character strings that are too long, improper values, and/or other integration errors that will or may prevent integration with the CPOE or EHR system. Thus, certain embodiments detect order set items that will not integrate with the target system prior to export of the order set to the target system. In addition to diagnosing potential export issues up-front, the export validation process may suggest to the user, via a user interface, corrective action prior to export and while the user is accessing a content editor. The user may then take such corrective action via the content editor prior to export of the order set, the system may then analyze the corrective action, and if such action solves the export issue, the system indicates the order set is ready for export. The user may then instruct the system to export the order set, and the system performs the export.

Thus, export validation process may identify potential integration barriers, deploying warning and error icons that provide the user with the opportunity to address problems and issues via the content editor during the order set development phase, rather than after attempting to import the order set into a target system.

Optionally, the user may be provided a control via which the user can turn off validation checking for the entire order set, or by a selected validation rule for a given term or section. For example, a user may want to turn off validation using a first validation rule if the user believes that the first rule is no longer needed because another, more accurate or relevant rule is implemented and being used to validate the order set section. Similarly, if a user wishes to print an order set without exporting the order set, there may be no need to perform export validation, and so export validation may be disabled for printing.

As noted above, terms from a source catalog may be mapped to terms used by a target system or format. Certain embodiments provide local mapping and global mapping of terms. Global mapping enables the removal of integration errors (e.g., caused by unmapped terms) across multiple or all order sets being managed by the system having the same issue (e.g., the same unmapped term). Such global mapping provides a more efficient integration of content into the electronic health record (EHR) system or Computerized Provider Order Entry (CPOE) system, facilitating a more streamlined approach to delivering evidence-based clinical decision support (CDS) to the point of care. Local mapping may be used to map an order detail of a specific order set to another term without changing the mapping for other order sets. Certain embodiments enable the mapping (and mapping overrides) to be performed via the content editor user interface further streamlining the order set generation and customization process.

Certain embodiments will now be discussed in relation to the figures.

FIG. 1 illustrates an example export validation flow process and associated components. At state 1, on the client side (which may be in the form of a user terminal hosting a browser or other device or application for retrieving, presenting, and traversing information resources, and which optionally may be web-based), the user edits a content object via a content editor. The edit may be in the form of a user data entry, a user data deletion, a user movement of content (e.g., a delete and paste operation), a section or detail addition or deletion, or other user manipulation within the content editor. The user edit may be treated as a command, which is intercepted by an event channel at state 2. At state 3, a validation service proxy, hosted by the client, monitors the event channel for selected edit commands or all edit commands, and determines whether to submit a corresponding validation request, including edit commands and associated metadata, to a validation service controller. The validation service controller may reside on a remote server, although optionally it may reside on the user terminal. The metadata may include an identifier for the order set being edited (the OS ID), an identifier corresponding to the selected export format, and an environment identifier (Env ID) which may identify a venue, such as a hospital or a set of hospitals, where the exported order set is to be used.

At state 4, the validation service controller receives the edit command and metadata. At state 5, the validation service controller uses the order set identifier to access the current version (pre-edit) of the corresponding order set from a content tree repository, which may be in the form of a database. At state 6, the validation service controller retrieves the order set tree, including a defined structure of the order set (e.g., order set, order set section, order set section orders, order set section order details, etc.). The user edit commands are applied to the order set tree, if needed. At state 7, the validation service controller uses the export format identifier to access and retrieve the corresponding export format validation rules from a rules depository. At state 8, the validation service controller applies the retrieved rules to the edited order set tree and determines if there are any rule violations (e.g., indicating that the user edit will or may prevent the edited order set from being successfully exported to the selected format). The validation service controller may also access a terminology service which interfaces to and accesses various terminology catalogs (e.g., from client EHR systems) and provides mapping facilities for mapping such client terminology catalogs to the terminology catalog provided by the provider of the order set. The validation service may store the state of a given term (e.g., whether it's active or not) and the state of its semantic readiness (e.g., whether it's mapped or not). The term state information may be accessed and used by the validation service controller in applying the rules (e.g., a rule which states that a term needs to be mapped to another term, or a rule which states that a term needs to be mapped to an active term).

The validation service controller generates and provides a validation response including notifications, such an identification of any validation issues (e.g., errors and warnings), suggested corrective actions, and/or an indication that the order set has been validated as ready for export. The validation service controller may also provide the edited order set tree structure and/or just the tree changes.

At state 9, the validation response and edit order set or order set changes are provided to the event channel. At state 10, the validation response and order set changes are transmitted to an indicator component, which presents the validation notifications and order tree edits to the user via the content editor.

Optionally, the edit commands may be continuously streamed to the validation service controller. Optionally, to enhance the user experience, a threshold number of commands need to be received prior to the validation process being performed. For example, for content edits, at least a minimum number, greater than one, of characters may need to be changed (deleted or added) prior to the validation processing being performed. Optionally, a buffer is used to buffer edit commands, and the validation process is performed periodically (e.g., every 500 ms) on the buffered edit commands, rather than continuously.

If an error export issue is detected, a corresponding validation notification may be provided to the user. If the user takes corrective action, the process will detect, in substantially real time, the corrective action as another edit command, and the validation process is performed as similarly discussed above. If the process determines that the user action has resolved the export issue, the process provides an indication, in substantially real time, that the issue has been resolved (e.g., by removing the previous notification and/or indicating that the order set is ready for export). The user may then instruct the system to export the order set and the order set is exported to the target format/system. Certain embodiments may optionally interact with a client, such as a web-based client, via an API. Thus, certain embodiments may provide synchronization validation for clients, such a web-based API client (e.g., where data/edits are communicated from/to the client via an API, and where data communicated via the API may be displayed via the client to the user).

Various example user interfaces will now be described.

In certain embodiments, the content editor user interface enables a user to develop and edit an order set from scratch, from an existing order set (which may be an order set template), or from a copy of existing order set. The validation process may be automatically enabled or the user may manually enable validation by activating a corresponding control.

As similarly discussed above, when the validation process detects an error or potential integration issue, it generates a notification which is presented/displayed to the user. Advantageously, in certain embodiments, this enables the user to correct the error/integration issue without having to navigate away from the content editor and prior to actually exporting the order set to a target system or importing the order set into the target system.

Depending on the type and/or severity of the error or integration issue detected (if any), a notification from a set of notifications may be selected by the validation process for presentation to the user. The selected notification can indicate the level of severity of an integration issue or the lack of an integration issue. Non-limiting examples of notifications are as follows:

"error" to identify relatively more severe types of errors that must be resolved for the order set to be successfully exported;

"warning" to identify an issue that may need to be resolved for the order set to export successfully;

"ready for export" to indicate the order set is ready to export to the target system.

The foregoing notifications may optionally be presented in conjunction with text describing in greater detail the cause of the integration issue and/or techniques to rectify the integration issue.

Notifications regarding more severe issues may be given precedence or emphasis in presentation relative to notifications for less severe issues. For example, for a collapsed order set section, a notification indicator for a more severe issue may be displayed in association with the collapsed section and a notification indicator for a less severe issue may not be displayed unless the collapsed section is expanded. By way of further example, if the notifications are presented in a list format by the system, the more severe notifications may be positioned towards the top of the list and the less severe notifications may be presented towards the bottom of the list. In addition or instead, the more severe notifications may be presented with a more noticeable color (e.g., red) than a less severe notification (which may be presented in yellow), while a "ready to export" notification may be presented in a color that indicates there is no issue (e.g., green). Different icons may be used for respective different severity levels.

By way of illustration, if an error prevent export is detected the system may present a "will not export" error message. For example, if an order set term cannot be mapped to a target format/system, the following error message may be presented:

"Error: [originating system] terms will not export. Select a custom catalog term."

The foregoing suggested corrective action ("select a custom catalog term") instructs the user to select an acceptable catalog term from a term catalog in place of the term currently included in the order set.

An example of a warning message that may be displayed if a certain field is populated is as follows: "Field will not export."

In the foregoing example, the message is a warning message, because it may not be necessary for the field to export. For example, the field may be a free form comment field that is not needed by the target system.

Additional example integration issues and corresponding notifications will be discussed elsewhere herein.

Optionally, in certain embodiments, even if an export error is detected, and a "will not export" notification is provided, the user may still instruct the system to export the order set. However, certain terms, sections, or details may be excluded from the exported order set and/or may be ignored by the target system when importing the exported order set. In other embodiments, the user may be prevented from instructing the system to export an order set with certain types of errors (e.g., by disabling the export control).

Figure 2A:
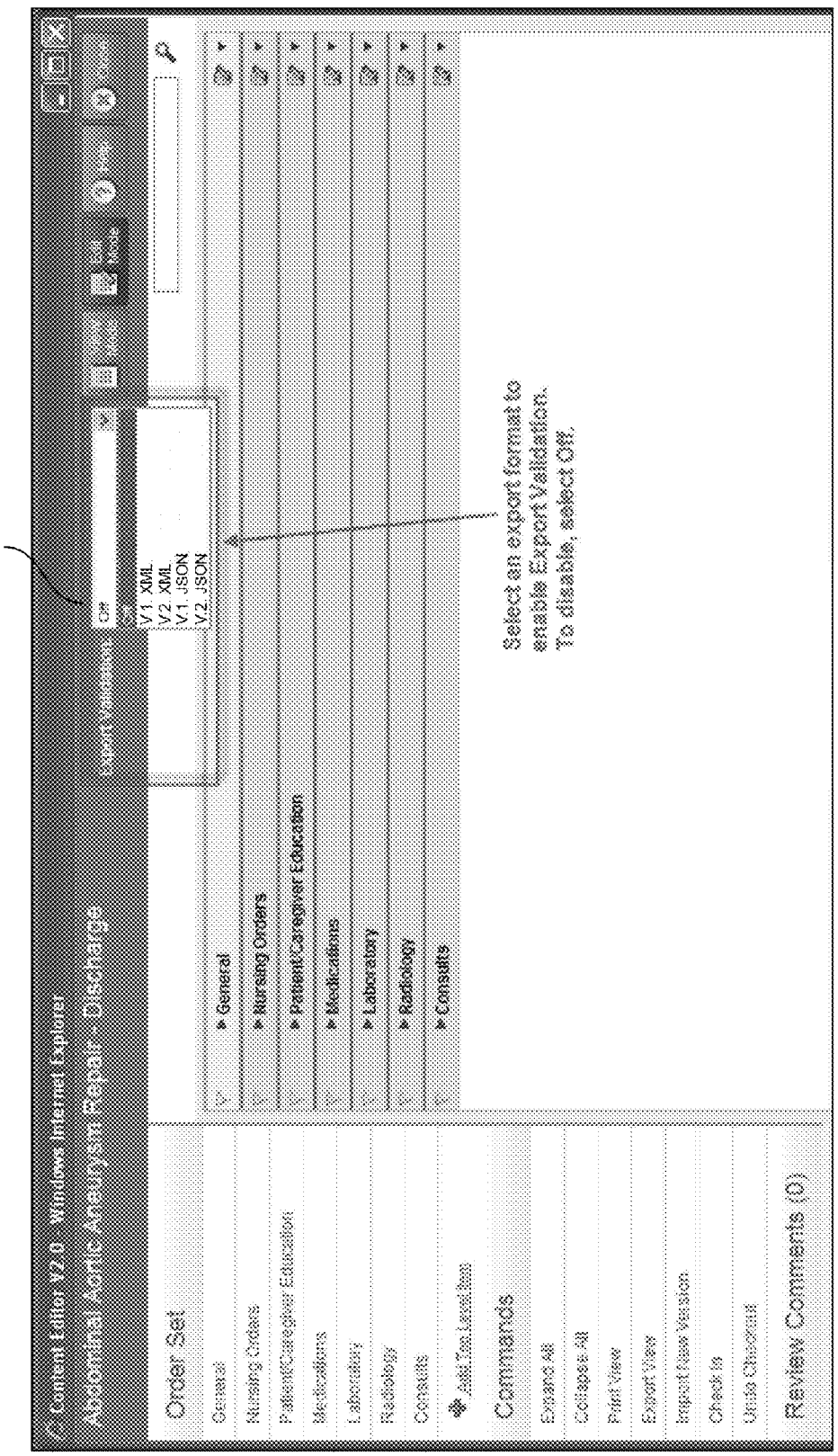

In certain embodiments, a content editor, such as that illustrated in FIG. 2A, is presented by the content management system for display on a user terminal (e.g., a dumb terminal, a desktop computer, a laptop computer, a tablet computer, a smart phone, an interactive television, etc.) connected to or part of the content management system. The content editor user interface includes a format selection menu 202A via which the user can select an export format, which in certain example embodiments will automatically enable validation checking and cause the validation system to monitor user edits of the order set and to detect whether a user edit or other factor may cause an export error with respect to the selected format. For example, the user may specify a format associated with a specified type and/or version of a CPOE system or an EHR system. The validation process will access corresponding rules, and will determine whether the order set includes a parameter that will prevent or hinder export to and integration with the selected CPOE system or EHR system.

The set of export formats included in the format selection menu may be configured differently for different users/entities to correspond to the target formats/systems available to a given user/entity. Optionally, if an export format is not configured, or if a user selected an export format off function, then the export function will not be displayed to the user, so as not to distract the user when the user is not going to request an export of an order set.

Figure 2B:
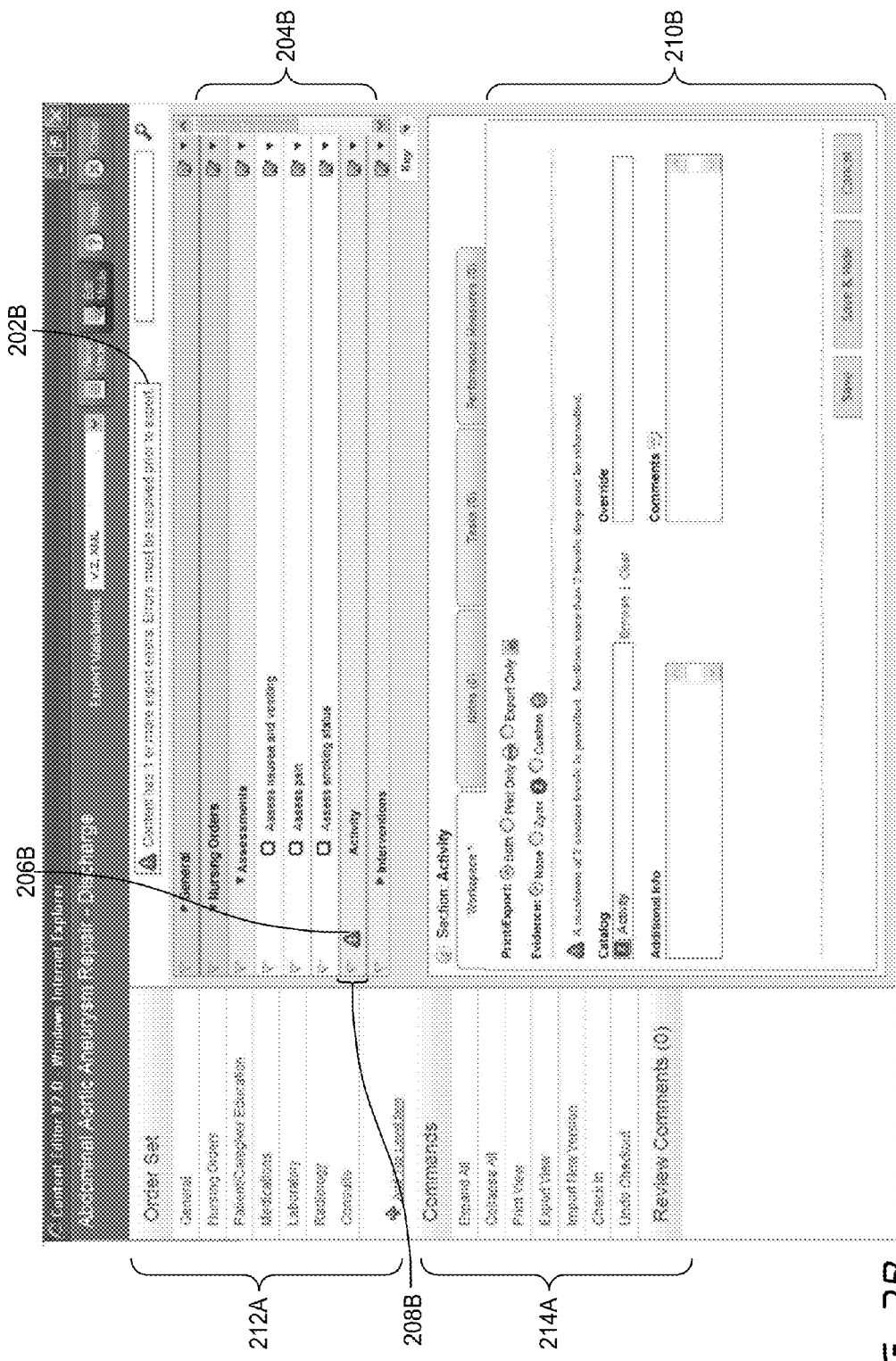

Referring now to FIG. 2B, an example content editor user interface is presented, wherein a discharge order set for abdominal aneurysm repair is being developed.

An order set menu 212B enables the user to select an order set from categories of order sets. A command menu 214B provides order set commands, such as expand all collapsed sections/subsections, collapse all sections/subsections, print view to preview what the order set will look like when printed, export view, import new version, check order set in, undo checkout, etc. The user interface may include an order set content grid area 204B, including sections and subsections.

Positioned near the top of the user interface is a notification summary 202B regarding the export validation status of the order set. The notification summary 202B may indicate the type(s) and/or overall quantities of errors/warnings detected by the validation process. In this example, the notification summary 202B indicates that there are one or more errors that must be corrected prior to export. Optionally, the summary may indicate how many of each error/warning notification types are pending (e.g., "There are 3 errors that must be corrected prior to export and 2 warning conditions indicating issues that may need to be corrected prior to export").

The order set sections/areas may be presented in a "collapsed" format in the content grid area 204B to enable the user to view many or all the available sections/areas at once, and to enable the user to select which order set content is shown or hidden on the user interface. The user can expand all order set sections or selected order set sections (e.g., by clicking on an expand control), and the system will display items with error/warning indicators, if any, on the content grid. The user can then edit a given section item and correct items that have associated error or warning indications.

Referring back to FIG. 2B, in the content grid area 204B an error icon 206B is presented in conjunction with an "activity" section 208B. The user can click on or otherwise select the activity section 208B to expand the section for editing via the editing workspace user interface 210B.

The error icon is displayed in the content editor user workspace interface 210B, with a message clearly explaining the cause of the error ("a maximum of 2 section levels is permitted"). The system also determines one or more corrective actions that the user may take to rectify the error, and provides the user with corresponding instructions on how to correct the error (e.g., "sections more than 2 levels deep must be reformatted"). The system may also notify the user of corrective action the system will take in the absence of appropriate user corrective action. For example, if the maximum acceptable character string length of the target system is 40 characters for a given term, the system may notify the user that the system will truncate the character string to 40 characters, and then the system may take such corrective action. By way of further example, if a term in the order set is not mapped to a term in the target format/client catalog, the system may create a mapping (e.g., to a medication detail string) and notify the user of the mapping.

Other tabbed user interfaces (e.g., notes, tasks, performance measures user interfaces) may be available as well.

Figure 2C:
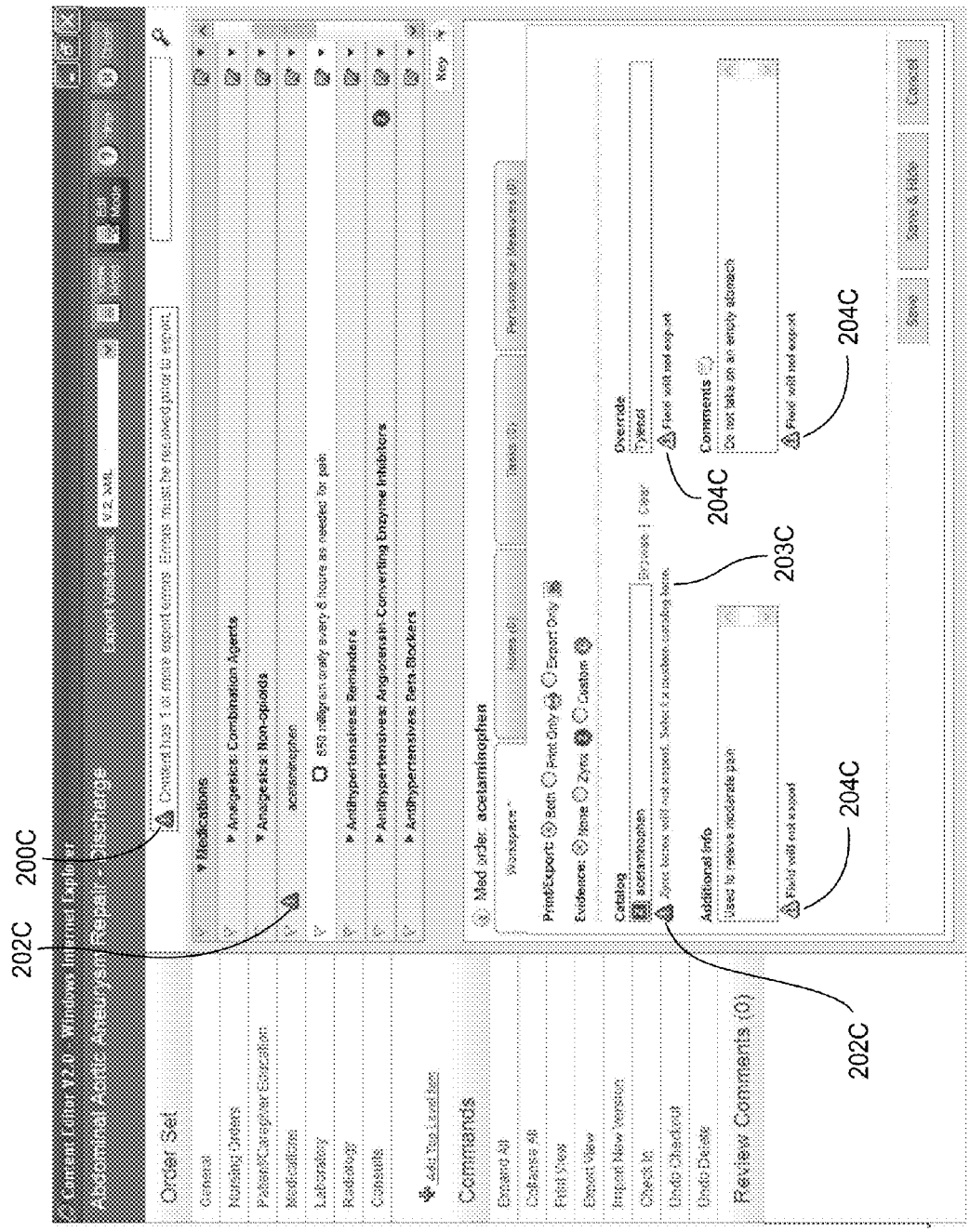

In the example content editor user interface illustrated in FIG. 2C, the validation process has detected a relatively more severe issue that will prevent the order set from being exported and a less severe issue that may prevent the order set from being exported. The system generates and presents a notification summary 200C, and an error notification icon 202C in the grid area (in the acetaminophen subsection of analgesics) and a message 203C in the workspace area corresponding to the issue that will prevent the order set from being exported ("terms will not export, select a custom catalog term). In addition, the system generates and presents warning notifications 204C and messages ("field will not export") corresponding to the less severe issues that may prevent the order set from being exported. In this example, because there are both error and warning issues for an item, the error indicator takes precedence over the warning indicator, and the error indicator appears in front of the order set item at issue on the content editor content grid, while the warning indicators are not displayed in the grid.

After the user takes corrective action by making an appropriate edit with respect to an item associated with a warning or error notification, the system may, in substantially real time, analyze the edited item and/or the order set as a whole, and if no further errors/warnings are detected, provide a corresponding notification to the user (e.g., a ready to export notification). Optionally, the system will maintain the presentation of the warning or error indicators until the user saves the corrected order set to the order set data store (e.g., by activating a save control), and then will remove the indicators for the corrected items from the user interface. This ensures that the corrective edits are saved and will be used when exporting the order set.

Following are non-limiting examples of integration issues that the system may be configured to detect and, in some cases, example notifications provided by the system (e.g., via the content editor user interface):

Too many characters. For example, the target system may only be capable of receiving character strings of no greater than a specified number for a given term or for a combined length of multiple fields or names (e.g., the name of a section and its subsections). By way of illustration, if the maximum length of a section and its subsections may not exceed 80 characters, the following notification may be provided "A maximum of 80 characters is allowed for a section and its sub-section name. If you do not reduce the number of characters to 80 or less, the name(s) will be truncated to 80 characters."

Multiple mappings of term. For example, if a given term in the order set maps to more than one term in the target system (as might occur via erroneous mapping performed manually by a user), the mapping may not be what the user desires. The following notification may be provided: "This detail is mapped to more than one vocabulary term. This could have an unintended effect on export."

Target system does not support bundles. If a bundle (a group of items that must be ordered together, rather than items that may optionally be ordered together or may be ordered independently) is included in the order set and the target system does not support bundles, the following notification may be provided: "Bundle is not supported for export."

Term not mapped. If a vocabulary term in the order set in not mapped to a vocabulary term in the target system/catalog, the following notification may be provided: "Term not mapped."

Medication detail not mapped. If a medication detail (e.g., dose strength, does unit, solution rate, solution rate unit) in the order set is not mapped to a term in the target system/catalog, the following notification may be provided: "This detail is not mapped."

Medication detail not mapped to orderable medication. If a medication detail in the order set is not mapped to an orderable medication in the target system/catalog, the following notification may be provided: "Medication detail not mapped to an orderable medicine."

Override detail not mapped. If an override detail (e.g., dose strength, does unit, solution rate, solution rate unit) in the order set is not mapped to a term in the target system/catalog, the following notification may be provided: "This override detail is not mapped."

Medication detail mapped to inactive term. If a medication detail (e.g., dose strength, does unit, solution rate, solution rate unit) in the order set is mapped to an inactive term in the target system/catalog, the following notification may be provided: "Medication detail mapped to inactive term."

Medication detail overridden with inactive term. If a medication detail (e.g., dose strength, does unit, solution rate, solution rate unit) in the order set is overridden with an inactive term, the following notification may be provided: "Override mapped to inactive term."

Input value not supported. If an input value inserted into a field (e.g., a workplace defined field (WDF)) is not supported for export, the following notification may be provided: "Field not supported for export."

Detail not supported. If a user adds a new detail to the order set (e.g., a free text term) that is not exportable, the user may be notified that the detail will not be exported (Optionally, the order set as a whole may still be exported, but the detail at issued may be excluded from the export or it may be ignored when the exported order set is uploaded to the target system).

Mapping cannot be completed. If a user unsuccessfully attempts to map a term to a client catalog term, where the mapping may be unsuccessful because the term is already mapped or for a technical reason, the following notification may be provided "The mapping cannot be completed at this time, please refresh the order set and try again."

Med order detail needed for export. If a detail is needed for export, the following notification may be provided "Med orders require at least one detail to export successfully."

User change in order (e.g., medication) without change in detail. For example, if a user changes an orderable medication without changing the corresponding dosage, the following warning notification may be provided: "Detail could be invalid because the order has changed. Please validate the detail." A resolve control may be presented which when activate enables the user to edit the order detail. If the user elects to proceed, the order set with the new drug detail is saved.

FIG. 6 illustrates additional rules, corresponding notification message type (e.g., error, warning), corresponding notification icons, and the order set object the rule applies to (e.g., section, non-medication orderable, non-medication detail, medication orderable, medication detail, plan of care, etc.).

The notifications and/or associated icons may be presented in the workspace, in the grid adjacent to the section, and/or adjacent to item that trigged the notification. In addition or instead, the notification may be presented in the notification summary. The system may determine the closest designated error/warning area relative to the section, subsection and/or detail causing a given integration issue, and may provide the corresponding notification for display in that closest area.

Example mapping-related user interfaces will now be discussed with respect to the figures. As illustrated, the system and user interfaces enable a user to map terms for one catalog (e.g., a source catalog which may be provided by the same entity that provided the order set template being edited) to another catalog, or override a mapping, during a content editing process using a content editor.

Referring now to FIG. 3A, a user has begun the process of adding a new order item for a drug (acetaminophen) to an order set. Because the user has not yet entered any details in the work defined fields (WDFs) for the drug (e.g., dosage strength, dosage unit, dose form, etc.), there is no mapping to a vocabulary term from a vocabulary catalog used by the target formant. Therefore, the validation process generates an error notification presented in the workspace, stating that "This item detail is not mapped." The validation process rules may indicate which and/or how many details need to be completed (e.g., need values entered) by the user, including alternative options, and acceptable value types (e.g., numeric, alphabetical, alphanumeric, etc.). For example, the rules may specify that both dose strength and dose unit values be specified OR both solution rate and solution rate valued be specified, AND that values entered into the dose strength and solution rates fields are numeric.

Referring now to FIG. 3B, the user has entered a dosage strength of 325. The system searches for a mapped term, as indicated by the status notification of "Validating" presented in the top right hand area of the content editor user interface. In this example, the system still cannot locate a mapping, and so the error notification is still presented by the system, as indicated in FIG. 3C. Referring to FIG. 3D, the user has entered more items into the work defined fields (e.g., dosage strength, dosage unit, dosage form, frequency), and the system again searches for a mapped term. In this example, the system can now locate a mapped item to a vocabulary term from a vocabulary catalog used by the target format. In response, the system removes the error notification to indicate the order set is validated and ready for export. A notification is presented indicating that after the user saves the edits, the item will be mapped to an identified term ("Acetaminophen 325 MG TAB" is this example). When the user saves the validated order set, a ready for export notification is presented.

FIG. 3E illustrates a user interface for the scenario where the user is adding an existing item detail, and a custom source catalog term, sometimes referred to as a medication detail string (MDS), is created. In this example, the new item is not mapped to a vocabulary term in the target catalog. Therefore, the validation process generates an error notification presented in the workspace, stating that "This item detail is not mapped." The system creates a custom MDS and presents a mapping control ("Map"). If the user activates the mapping control, the system will then map the custom MDS to a term identified by the user (e.g., selected by the user from a list presented to the user, such as a search result list generated by the system in response to a user query).

FIG. 3F illustrates a user interface for the scenario where the user is editing an existing item detail, and the system locates a corresponding unmapped custom source catalog term (e.g., an MDS). In this example, the edited item (Medication: Acetaminophen; Does strength: 325 MG; Does form: orally; Frequency: 2 times a day) is not mapped to a vocabulary term in the target catalog. Therefore, the validation process generates an error notification which is presented in the workspace, stating that "This item detail is not mapped," and an error notification is provided at the top left hand side of the content editor user interface ("Content has export error(s)"). However, the system has located an associated unmapped MDS from the source catalog associated with the supplier of the order set being edited.

Therefore, as illustrated in FIG. 3G, the system launches a map detail window listing the MDS being mapped ("Acetaminophen 325 MG orally 2 times a day") and including a search field. The search field enables the user to search for a term to map to from a catalog (sometimes referred to as a dictionary) associated with the target format. The user can enter a character string and the system will iteratively, with each entered character (or after at least a specified number of characters), present matching terms in a search results area, optionally including the term name, term type, and the vocabulary which contains the term (which may be helpful information where multiple vocabularies exist for a given environment (e.g., a hospital)). The user can select a term from the search results ("Acetaminophen 325 MG TAB" in this example) and activate a map control. Next, referring to FIG. 3H, the map detail window is removed, and a dynamically generated message is provided reciting the term that the order item will be mapped to once the user saves the edited order set ("After saving, this item will be mapped to Acetaminophen 325 MG TAB"). Once the user saves the order set, the validation process determines that the order set is ready for export, and generates a ready for export message, as indicated in FIG. 3I.

Figure 4A:
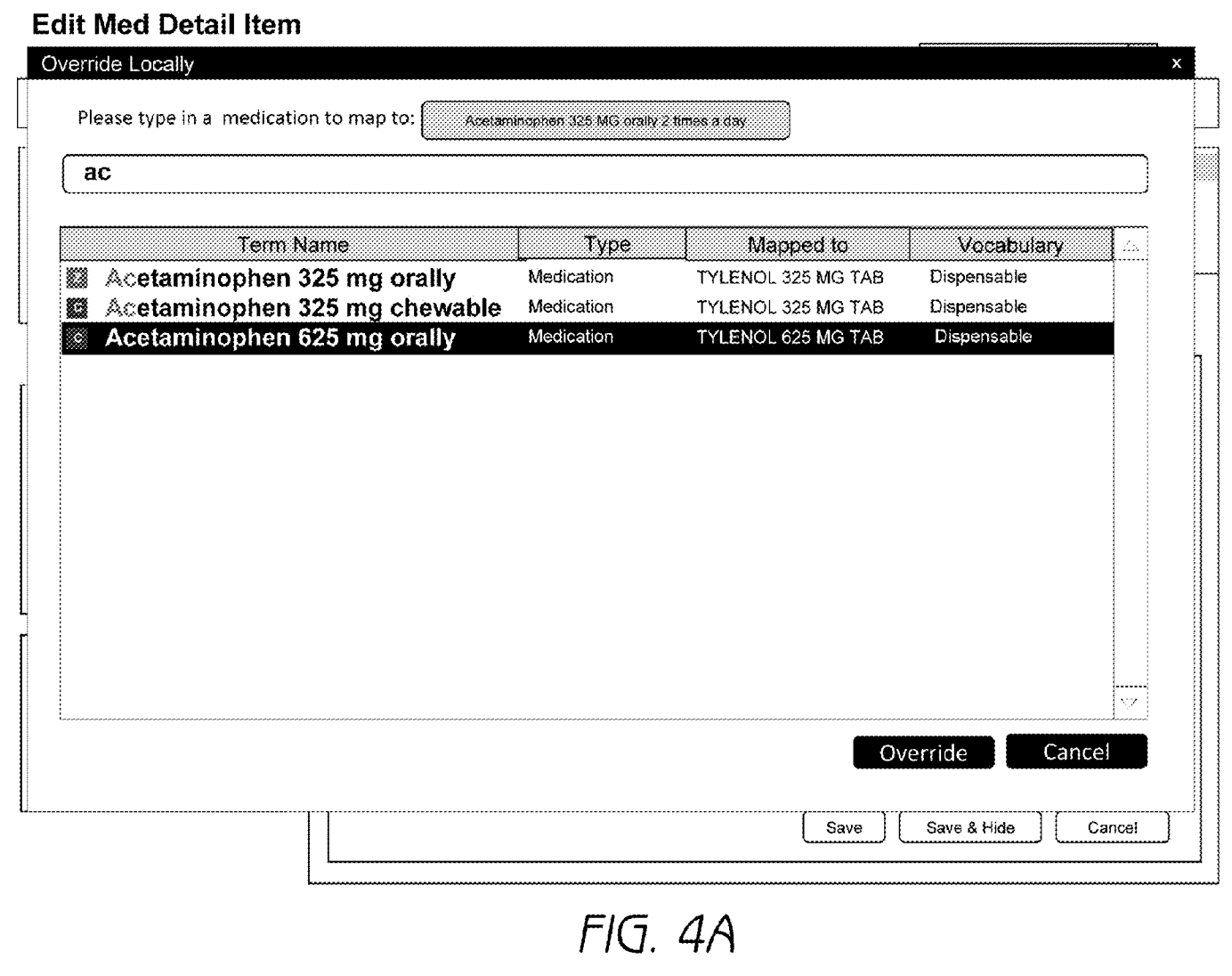

As discussed above, a user can locally override an existing term mapping. Thus, a term may be mapped via an MDS, a medication, or an override. By way of illustration, a user may want to select a different medication than is currently mapped to be mapped to a given detail. To accomplish this, while editing an order set detail via a content editor user interface, a user can activate an override control to override the current mapping. When a user activates the override control, an override detail user interface is presented (e.g., via a pop-up window). The order sentence and the currently mapped term may be presented. Referring to FIG. 4A, the user can select a catalog term from a mapping window and the system then enables an override control. The mapping window may include a dynamically generated list of active (and optionally inactive) mapped catalog terms matching characters entered in a search field. An "unmap" warning notification may be presented to the user. The user activates the override control, the mapping window closes, as illustrated in FIG. 4B, and the selected catalog term will be used to override the term in the item detail. Referring to FIG. 4B, an updated indication is displayed adjacent to the term the item detail will be exported as ("Tylenol 625 MG TAB [updated]"), and optionally the override control will change to a clear override control ("Clear Override"). Activation of the clear override control will clear the override term, and the system will revert the state of the catalog term to the state that existed prior to creating the override. For example, if the term was previously globally mapped, the term will again be globally mapped. By way of further example, if the term was previously unmapped, the term again will be unmapped.

Referring to FIG. 5A, an example user experience for mapping an order detail is illustrated. In this example, a medication ("med") detail is not mapped, and a corresponding notification is provided ("This item detail is not mapped"). In response to determining there is an unmapped med detail, the system dynamically includes and enables a "map" control in the user interface. In this example, the user is editing a medication detail, and has activated the "map" control. Referring to FIG. 5B, a map detail mapping user interface is provided as an overlay in the content editor user interface. The catalog term to be mapped appears in the top left field. A vocabulary term default description is optionally displayed. The user enters a term to search for in the map search field. A dynamically generated list of matching active terms (including the term name and term type), including mapped and unmapped terms is presented. The terms may be from some or all available vocabularies in the relevant environment, but may be limited to the type of term being mapped, which in this example are medication type terms. The user may select a term in the list, and the term is highlighted and is optionally reproduced below the list in association with an indication that the selected term will be mapped to the medication order specified in the workspace ("Map vocabulary term ABDOMINAL AORTAGRAM to catalog term prasugrel 2 milligram orally"). Optionally, a warning is presented in conjunction with the reproduced highlighted term, indicating what steps will need to be performed to unmap the term. The system also enables a map control. When the user activates the map control, the interface presented in FIG. 5B may be closed, and the term selected by the user is displayed in the medication detail workspace.

Thus, certain embodiments described herein enable a user to validate a document, such as an order set, being developed for export to another system, during the editing process. Integration error and warning notifications may be provided to the user in substantially real time via a content editor during the editing process, enabling the user to address such integration issues prior to export and without having to navigate away from the content editor. Using such embodiments, the process of developing an editing order sets for export is greatly enhanced as compared to conventional systems.

It is understood that while the foregoing processes and systems are described in the context of order set editing and validation, other types of content, such as plan of care content, may be similarly processed and validated.

While certain embodiments may be illustrated or discussed as having certain example components, additional, fewer, or different components may be used. Process described as being performed by a server system may be performed by a user terminal, client or other system or systems. Processes described as being performed by a user terminal or client may be performed by a server system or other system or systems. User and system actions and edits may be undone by the user or system (e.g., a user may unmap a determine mapped by the user or system). Data described as being accessed from a given source may be stored by and accessed from other sources.

Further, with respect to the processes discussed herein, various states may be performed in a different order, not all states are required to be reached, and fewer, additional, or different states may be utilized. User interfaces described herein may be presented (and user instructions may be received) via a user computing device using a browser, other network resource viewer, or otherwise. For example, the user interfaces may be presented (and user instructions received) via a dedicated application (sometimes referred to as an "app") installed on the user's mobile phone, laptop, pad, desktop, television, set top box, or other terminal. Various features described or illustrated as being present in different embodiments or user interfaces may be combined into the same embodiment or user interface.

The systems and methods disclosed herein can be implemented in hardware, software, firmware, or a combination thereof. Software can include computer readable instructions stored in memory (e.g., non-transitory, tangible memory, such as solid state memory (e.g., ROM, EEPROM, FLASH, RAM), optical memory (e.g., a CD, DVD, Blu-ray disc, etc.), magnetic memory (e.g., a hard disc drive), etc., configured to implement the algorithms on a general purpose computer, special purpose processors, or combinations thereof. For example, one or more computing devices, such as a processor, may execute program instructions stored in computer readable memory to carry out processed disclosed herein. Hardware may include state machines, one or more general purpose computers, and/or one or more special purpose processors.

Conditional language, such as, among others, "can," "could," "might," or "may," unless specifically stated otherwise, or otherwise understood with the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features elements, and/or steps are included or are performed in any particular embodiment. Further, while certain user interfaces may utilize terms such as "must" or the like with respect to certain user actions or data, such terms are used to illustrate certain embodiments, and do not imply that other embodiments require such user actions or data.

Any process descriptions, elements, or blocks in the flow diagrams described herein, and/or depicted in the attached figures, should be understood as potentially representing modules, segments, or portions of code which include one or more executable instructions for implementing specific logical functions or steps in the process. Implementations are included within the scope of the embodiments described herein which elements or functions which may be deleted, depending on the functionality involved, as would be understood by those skilled in the art.

While the disclosure may reference to a user hovering over, pointing at, or clicking on a particular item, other techniques may be used to detect an item of user interest. For example, the user may touch the item via a touch screen, or otherwise indicate an interest.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein. In addition, various features of different embodiments may be combined to form still further embodiments. For example, aspects found in different user interfaces may be combined to form still further user interface.

What is claimed is:

1. A method of processing order sets, the method comprising:

providing for display on a user terminal a content editor user interface configured to enable a user to create or edit an order set;

receiving, at a computer system, a user selection of a target format to which the order set is to be exported;

determining that the user has included a quantity of section levels exceeding a first level limit associated with the target format; and at least partly in response to determining that the user has included the quantity of section levels exceeding the first level limit associated with the target format, providing a corresponding notification to the user and an indication that the order set is not ready for export;

detecting, by the computer system, a user edit with respect to the order set in real time;

accessing, by the computer system, at least a first validation rule from memory storing a plurality of validation rules, the plurality of order set validation rules include one or more mapping rules for mapping terms in a source catalog to terms used by the user selected target format;

accessing, by the computer system, a first version of the order set without the user edit;

applying by the computer system, in real time, the user edit to the first version of the order set to generate an edited order set;

applying by the computer system, in real time, the first validation rule to the edited order set to obtain a validation evaluation indicating whether the edited order set is ready for export to the target format;

based at least in part on the validation evaluation, providing by the computer system in real time, a corresponding validation notification for display via the content editor; and after determining that the order set is ready for export, exporting by the computer system the order set, including at least one user edit, to the user selected target format.

2. The method as defined in claim 1, the method further comprising:

determining that the user has included an unmapped term in the order set; and at least partly in response to determining that the user has included the unmapped term in the order set, providing a corresponding notification to the user; and enabling the user to map the unmapped term to a term associated with the user selected format.

3. The method as defined in claim 1, the method further comprising:

determining that the user has included an inactive term in the order set; and at least partly in response to determining that the user has included the inactive term in the order set, providing a corresponding notification to the user; and enabling the user to select a mapped term.

4. The method as defined in claim 1, the method further comprising:

providing a user interface via which the user can locally override a global mapping a first term;

receiving a local mapping for the first term from the user;

determining if the local mapping complies with at least one rule from the order set validation rule repository; and providing a notification to the user indicating whether the local mapping complies with at least one rule from the order set validation rule repository.

5. The method as defined in claim 1, the method further comprising:

determining that the user has requested an override mapping for a first term; and at least partly in response to determining that the user has requested the override mapping for the first term and that the override mapping is not supported by the target format, providing a corresponding notification to the user.

6. The method as defined in claim 1, the method further comprising continuously streaming user edits to a validation service controller, wherein the validation service controller is configured to apply validation rules with respect to user order set edits.

7. The method as defined in claim 1, the method further comprising:

buffering at least a first quantity of user order set edits, the first quantity being greater than one; and providing the first quantity of user order set edits to a validation service controller, wherein the validation service controller is configured to apply validation rules with respect to user order set edits.

8. A method of processing order sets, the method comprising:

providing, by a computer system, for display on a display device a content editor user interface configured to enable a user to create or edit an order set;

receiving, by the computer system, a user selection of a target format to which the order set is to be exported;

determining that the user has included a quantity of section levels exceeding a first level limit associated with the target format; and at least partly in response to determining that the user has included the quantity of section levels exceeding the first level limit associated with the target format, providing a corresponding notification to, the user and an indication that the order set is not ready for export;

detecting, by the computer system, a user edit with respect to the order set in real time;

accessing, by the computer system, at least a first validation rule;

applying by the computer system, in real time, the first validation rule to the order set, including the user edit;

evaluating, by the computer system, whether an integration issue exists with respect to the target format based at least in part on the application of the first validation rule to the order set, including the user edit;

based at least in part on the evaluation, providing by the computer system in real time, a validation notification for display; and after providing the notification for display, exporting the order set, including at least one user edit, to the user selected target format.

9. The method as defined in claim 8, the method further comprising:

determining that the user has included an unmapped term in the order set; and at least partly in response to determining that the user has included the unmapped term in the order set, providing a corresponding notification to the user; and enabling the user to map the unmapped term to a term associated with the user selected format.

10. The method as defined in claim 8 the method further comprising:

determining that the user has included an inactive term in the order set; and at least partly in response to determining that the user has included the inactive term in the order set, providing a corresponding notification to the user; and enabling the user to select a mapped term.

11. The method as defined in claim 8, the method further comprising:

providing a user interface via which the user can locally override a global mapping a first term;

receiving a local mapping for the first term from the user;

determining if the local mapping complies with at least one rule from the order set validation rule repository; and providing a notification to the user indicating whether the local mapping complies with at least one rule from the order set validation rule repository.

12. The method as defined in claim 8, the method further comprising:

determining that the user has requested an override mapping for a first term; and at least partly in response to determining that the user has requested the override mapping for the first term and that the override mapping is not supported by the target format, providing a corresponding notification to the user.

13. The method as defined in claim 8, the method further comprising continuously streaming user edits to a validation service controller, wherein the validation service controller is configured to apply validation rules with respect to user order set edits.

14. The method as defined in claim 8, the method further comprising:

buffering at least a first quantity of user order set edits, the first quantity being greater than one; and providing the first quantity of user order set edits to a validation service controller, wherein the validation service controller is configured to apply validation rules with respect to user order set edits.

15. Non-transitory computer readable media storing instructions that when executed by a computer system are configured to cause the computer system to perform operations, comprising:

providing for display on a display device a content editor user interface configured to enable a user to create or edit an order set;

receiving a user selection of a target format to which the order set is to be exported;

determining that the user has included a quantity of section levels exceeding a first level limit associated with the target format; and at least partly in response to determining that the user has included the quantity of section levels exceeding the first level limit associated with the target format, providing a corresponding notification to the user and an indication that the order set is not ready for export;

detecting a user edit with respect to the order set in real time;

accessing at least a first validation rule;
applying by the computer system, in real time, the first validation rule to the order set, including the user edit;
evaluating whether an integration issue exists with respect to the target format based at least in part on the application of the first validation rule to the order set, including the user edit;
based at least in part on the evaluation, providing, in real time, a validation notification for display; and
after providing the notification for display, exporting the order set, including at least one user edit, to the user selected target format.

16. The non-transitory computer readable media as defined in claim 15, the operations further comprising:
determining that the user has included an unmapped term in the order set; and
at least partly in response to determining that the user has included the unmapped term in the order set, providing a corresponding notification to the user; and
enabling the user to map the unmapped term to a term associated with the user selected format.

17. The non-transitory computer readable media as defined in claim 15, the operations further comprising:
determining that the user has included an inactive term in the order set; and
at least partly in response to determining that the user has included the inactive term in the order set, providing a corresponding notification to the user; and
enabling the user to select a mapped term.

18. The non-transitory computer readable media as defined in claim 15, the operations further comprising:
providing a user interface via which the user can locally override a global mapping a first term;
receiving a local mapping for the first term from the user;
determining if the local mapping complies with at least one rule from the order set validation rule repository; and
providing a notification to the user indicating whether the local mapping complies with at least one rule from the order set validation rule repository.

19. The non-transitory computer readable media as defined in claim 15, the operations further comprising:
determining that the user has requested an override mapping for a first term; and
at least partly in response to determining that the user has requested the override mapping for the first term and that the override mapping is not supported by the target format, providing a corresponding notification to the user.

20. The non-transitory computer readable media as defined in claim 15, the operations further comprising continuously streaming user edits to a validation service controller, wherein the validation service controller is configured to apply validation rules with respect to user order set edits.

21. The non-transitory computer readable media as defined in claim 15, the operations further comprising:
buffering at least a first quantity of user order set edits, the first quantity being greater than one; and
providing the first quantity of user order set edits to a validation service controller, wherein the validation service controller is configured to apply validation rules with respect to user order set edits.

22. An order set processing system, comprising:
a computing system;
non-transitory computer readable media storing instructions that when executed by the computer system are configured to cause the computer system to perform operations, comprising:
providing for display on a display device a content editor user interface configured to enable a user to create or edit an order set;
receiving a user selection of a target format to which the order set is to be exported;
determining that the user has included a quantity of section levels exceeding a first level limit associated with the target format; and
at least partly in response to determining that the user has included the quantity of section levels exceeding the first level limit associated with the target format, providing a corresponding notification to the user and an indication that the order set is not ready for export;
detecting a user edit with respect to the order set in real time;
accessing at least a first validation rule;
applying by the computer system, in real time, the first validation rule to the order set, including the user edit;
evaluating whether an integration issue exists with respect to the target format based at least in part on the application of the first validation rule to the order set, including the user edit;
based at least in part on the evaluation, providing, in real time, a validation notification for display; and
after providing the notification for display, exporting the order set, including at least one user edit, to the user selected target format.

23. The order set processing system as defined in claim 22, the operations further comprising:
determining that the user has included an unmapped term in the order set; and
at least partly in response to determining that the user has included the unmapped term in the order set, providing a corresponding notification to the user; and
enabling the user to map the unmapped term to a term associated with the user selected format.

24. The order set processing system as defined in claim 22, the operations further comprising:
determining that the user has included an inactive term in the order set; and
at least partly in response to determining that the user has included the inactive term in the order set, providing a corresponding notification to the user; and
enabling the user to select a mapped term.

25. The order set processing system as defined in claim 22, the operations further comprising.:
providing a user interface via which the user can locally override a global mapping a first term;
receiving a local mapping for the first term from the user;
determining if the local mapping complies with at least one rule from the order set validation rule repository; and
providing a notification to the user indicating whether the local mapping complies with at least one rule from the order set validation rule repository.

26. The order set processing system as defined in claim 22, the operations further comprising:
determining that the user has requested an override mapping for a first term; and
at least partly in response to determining that the user has requested the override mapping for the first term and that the override mapping is not supported by the target format, providing a corresponding notification to the user.

27. The order set processing system as defined in claim 22, the operations further comprising continuously streaming user edits to a validation service controller, wherein the validation service controller is configured to apply validation rules with respect to user order set edits.

28. The order set processing system as defined in claim 22, the operations further comprising:
- buffering at least a first quantity of user order set edits, the first quantity being greater than one; and
- providing the first quantity of user order set edits to a validation service controller, wherein the validation service controller is configured to apply validation rules with respect to user order set edits.

29. The order set processing system as defined in claim 22, further comprising:
- a validation service proxy configured to monitor, in real-time, if a user edit has been made via the order set content editor and to determine whether to submit a corresponding validation request and metadata associated with the order set being edited to a validation service controller;
- the validation service controller, wherein the validation service controller is configured:
- to receive the validation request and the metadata from the validation service proxy;
- select one or more export validation rules, based at least in part on at least one order set export format selected by the user; and
- apply, in real-time, the selected one or more export validation rules to the order set, including at least one user edit to determine whether an integration issue exists.

* * * * *